(12) United States Patent
Su (10) Patent No.: US 7,185,348 B2
(45) Date of Patent: Feb. 27, 2007

(54) OPTICAL DISK DRIVE

(75) Inventor: Chien-An Su, Tainan (TW)

(73) Assignee: BENQ Corporation, Taoyuan (TW)

( * ) Notice: Subject to any disclaimer, the term of this patent is extended or adjusted under 35 U.S.C. 154(b) by 505 days.

(21) Appl. No.: 10/725,708

(22) Filed: Dec. 2, 2003

(65) Prior Publication Data

US 2004/0194120 A1    Sep. 30, 2004

(30) Foreign Application Priority Data

Mar. 27, 2003   (TW) ............................. 92106920 A (51) Int. Cl.
*G11B 7/08* (2006.01)
(52) U.S. Cl. .................................... 720/676
(58) Field of Classification Search ................ 720/676, 720/572, 673, 671; 369/249.1; 292/127
See application file for complete search history.

(56) References Cited

U.S. PATENT DOCUMENTS 3,907,346 A * 9/1975 Van Klompenburg ....... 292/127
4,914,647 A * 4/1990 Ono et al. ................... 720/673
5,258,971 A * 11/1993 Yamamoto et al. ......... 720/671

FOREIGN PATENT DOCUMENTS

JP          62-229581        10/1987
JP          06036480 A    *  2/1994

* cited by examiner

*Primary Examiner*—Tianjie Chen
(74) *Attorney, Agent, or Firm*—Quintero Law Office (57) ABSTRACT

An optical disk device. The optical disk device includes a main guide rod, a sub guide rod, a pickup head, and a protrusion. The main guide rod and the sub guide rod are parallel. The pickup head has a clamp to grasp the sub guide rod. The protrusion is disposed on the sub guide rod and movable between a first and second position. When the protrusion is in the first position, the protrusion blocks the clamp and restricts a movement of the pickup head. When the protrusion is in the second position, the clamp is released.

7 Claims, 8 Drawing Sheets

OPTICAL DISK DRIVE

BACKGROUND OF THE INVENTION

1. Field of the Invention

The present invention relates to an optical disk drive, and in particular to an optical disk drive with a protection of the pickup head.

2. Description of the Related Art

Optical disk drives are widely used in notebooks and desktop computers. Most computer manufacturers regard CD-ROM drives as a standard equipment. Optical disk drives are categorized into external and internal types. When the optical disk drives are shipped, the pickup head therein may be damaged due to vibrations. Usually, to prevent damages, a small piece of hard cardboard is inserted to protect the pickup head. However, this method is not reliable and is not applicable to internal type disk drives. Without any protecting device during shipping, the pickup head may moves along guide rods in the internal type optical disk drive to cause damages.

Figure 1:
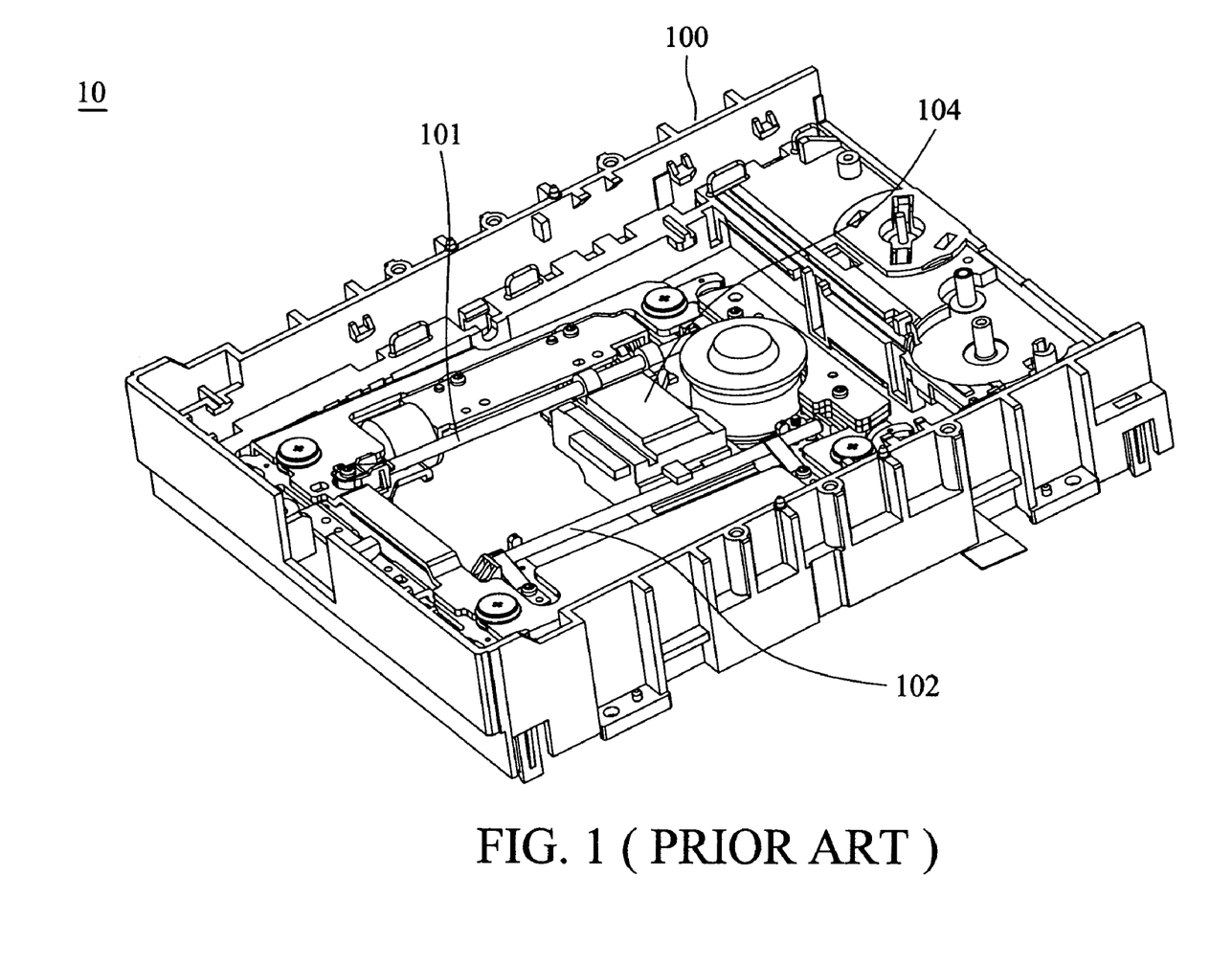
FIG. 1 is a perspective view showing the pickup head and guide rods of a conventional optical disk drive.

FIG. 1 is a perspective view showing the pickup head and guide rods of a conventional optical disk drive. The optical disk drive 10 has a chassis 100, a main guide rod 101, a sub guide rod 102, and a pickup head 104. The main and sub guide rods 101, 102 are disposed on either side of the pickup head 104. The pickup head 104 is unrestricted and movable along both the main and sub guide rods 101, 102. During shipping, freely moveable pickup head 104 may collide with other elements in the optical disk drive 10, and thus cause damages of the pickup head and the optical disk drive 10.

Hence, there is a need for an optical disk drive with pickup head protection during transport.

SUMMARY OF THE INVENTION

Accordingly, an object of the invention is to provide an optical disk drive that prevents the pickup head from colliding with other elements during shipping.

The invention can be applied to any electronic device with guide rods, such as scanner or inkjet printer.

The present invention provides an optical disk device having a main guide rod, a sub guide rod, a pickup head, and a protrusion. The main guide rod and the sub guide rod are parallel to each other. The pickup head includes a clamp to grasp the sub guide rod. The protrusion is disposed on the sub guide rod and movable between a first and a second position. When the protrusion is in the first position, the protrusion blocks the clamp and further restricts a movement of the pickup head. When the protrusion is in the second position, the clamp is released.

The sub guide rod has two ends and a slot is formed on one of the ends. The optical disk drive further includes a chassis, and one end of the sub guide rod is extended out of the chassis.

The optical disk drive further has a sensor, and the sub guide rod is disposed between the clamp and the sensor. When the protrusion is in the second position, the protrusion contacts the sensor, which detects a separation between the protrusion and the clamp, so as to detect a movable status of the pickup head.

According to a second embodiment of the present invention, the optical disk drive includes a main guide rod, a sub guide rod, a pickup head, a shaft and a protrusion. The sub guide rod is disposed substantially parallel to the main guide rod. The pickup head is movably disposed on the main guide rod and the sub guide rod, and the pickup head has a clamp to grasp the sub guide rod. The shaft is disposed along the sub guide rod, and the protrusion is disposed on the shaft. The protrusion is movable between a first and second position. When the protrusion is in the first position, the protrusion blocks the clamp and restricts the movement of the pickup head. When the protrusion is in the second position, the clamp is released.

The shaft has two ends, and a slot is formed on one of the ends. The optical disk drive further includes a chassis, and one end of the sub guide rod is extended out of the chassis.

The optical disk drive further includes a sensor. The shaft is disposed between the clamp and the sensor. When the protrusion is in the second position, the protrusion contacts the sensor, which detects the separation between the protrusion and the clamp, and hence, detects a movable status of the pickup head.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 2:
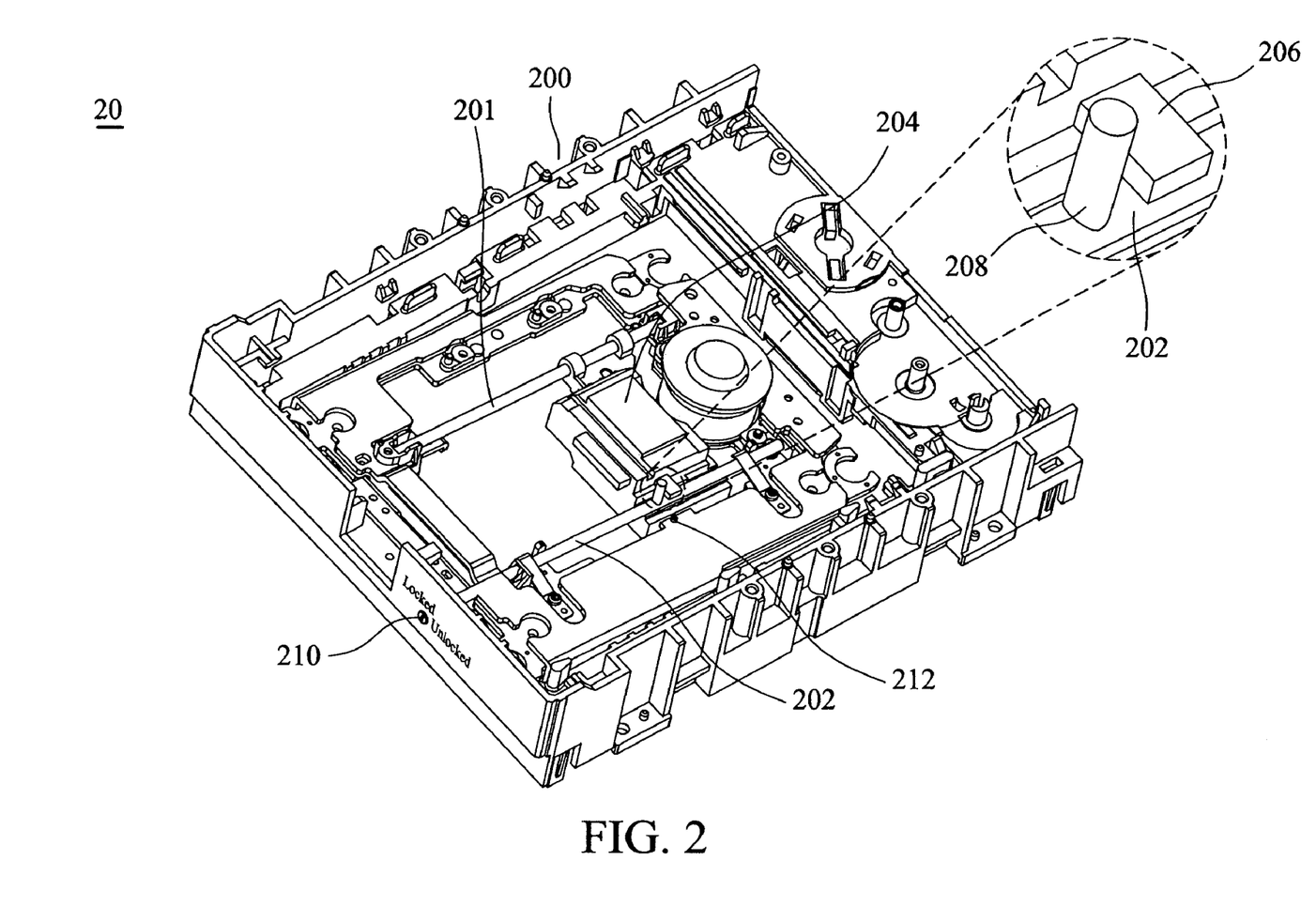
FIG. 2 is a schematic view of the optical disk drive and an enlarged view of the protrusion according to the first embodiment of the invention.

FIG. 2 is a schematic view of the optical disk drive and an enlarged view of the protrusion according to the first embodiment of the invention. The optical disk drive has a chassis 200, a main guide rod 201, a sub guide rod 202, a pickup head 204, and a protrusion 208.

The main guide rod 201 and the sub guide rod 202 are parallel to each other. The pickup head 204 is movably disposed on the main and sub guide rods 201, 202. The pickup head 204 has a clamp 206 which is used to grasp the sub guide rod 202.

Figure 3:
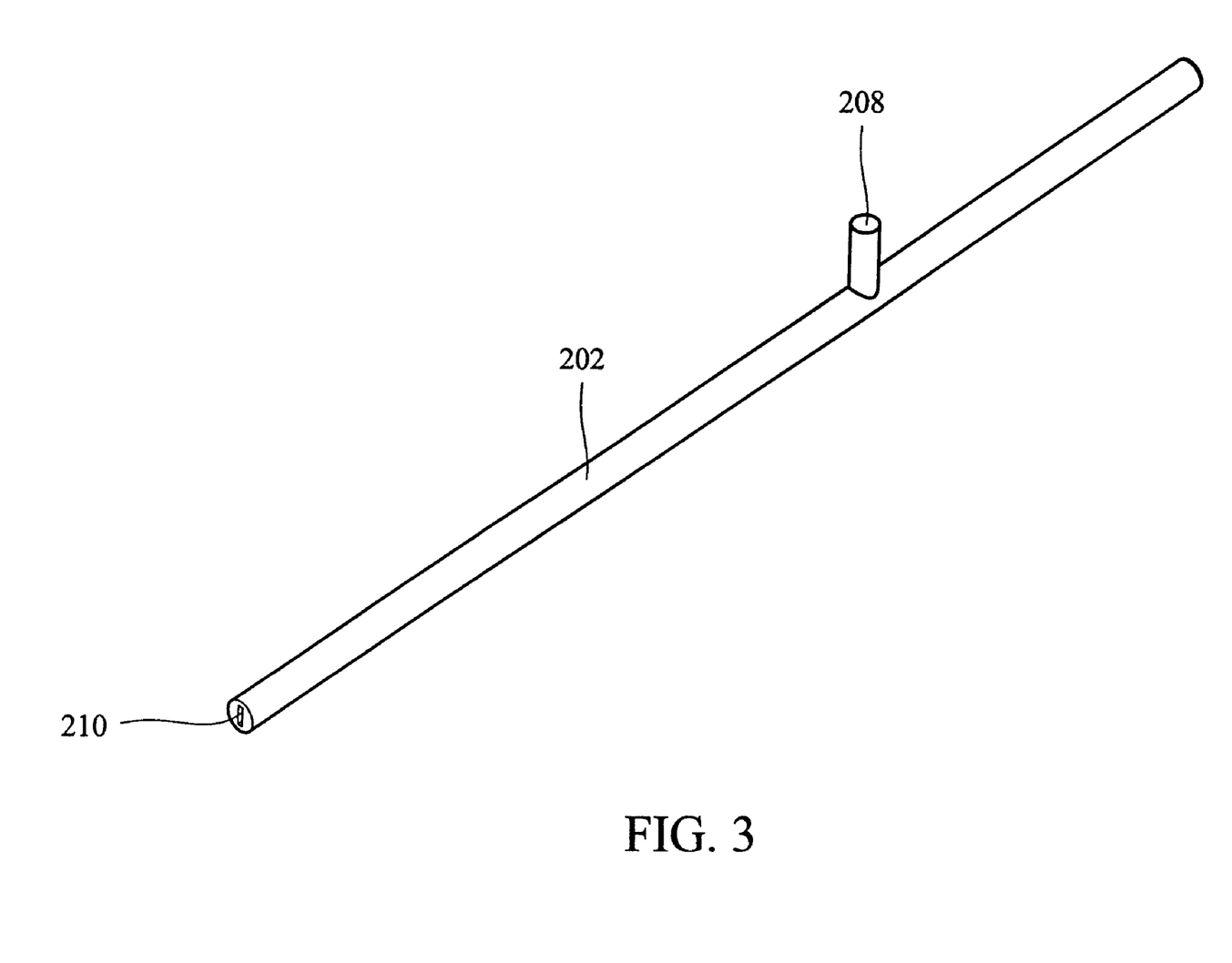
FIG. 3 is a local enlarged view of the sub guide rod according to the first embodiment of the invention.

FIG. 3 is a local enlarged view of the sub guide rod according to the first embodiment of the invention. This sub guide rod 202 of the present invention is different from the sub guide rod 102 of the prior art as shown in FIG. 1. Referring to FIG. 3, the sub guide rod 202 has a protrusion 208 to restrict the movement of the pickup head 204. When the protrusion 208 is in a starting position of the pickup head 204 or when the protrusion 208 is placed near the clamp 206, the protrusion 28 blocks the clamp 206 and further restricts the movement of the pickup head 204. As a result, during shipping, the pickup head 204 remains in a locked status, the pickup head 204 will not contact other elements in the optical disk drive so that less damage will occur to the pickup head 204.

Figure 4:
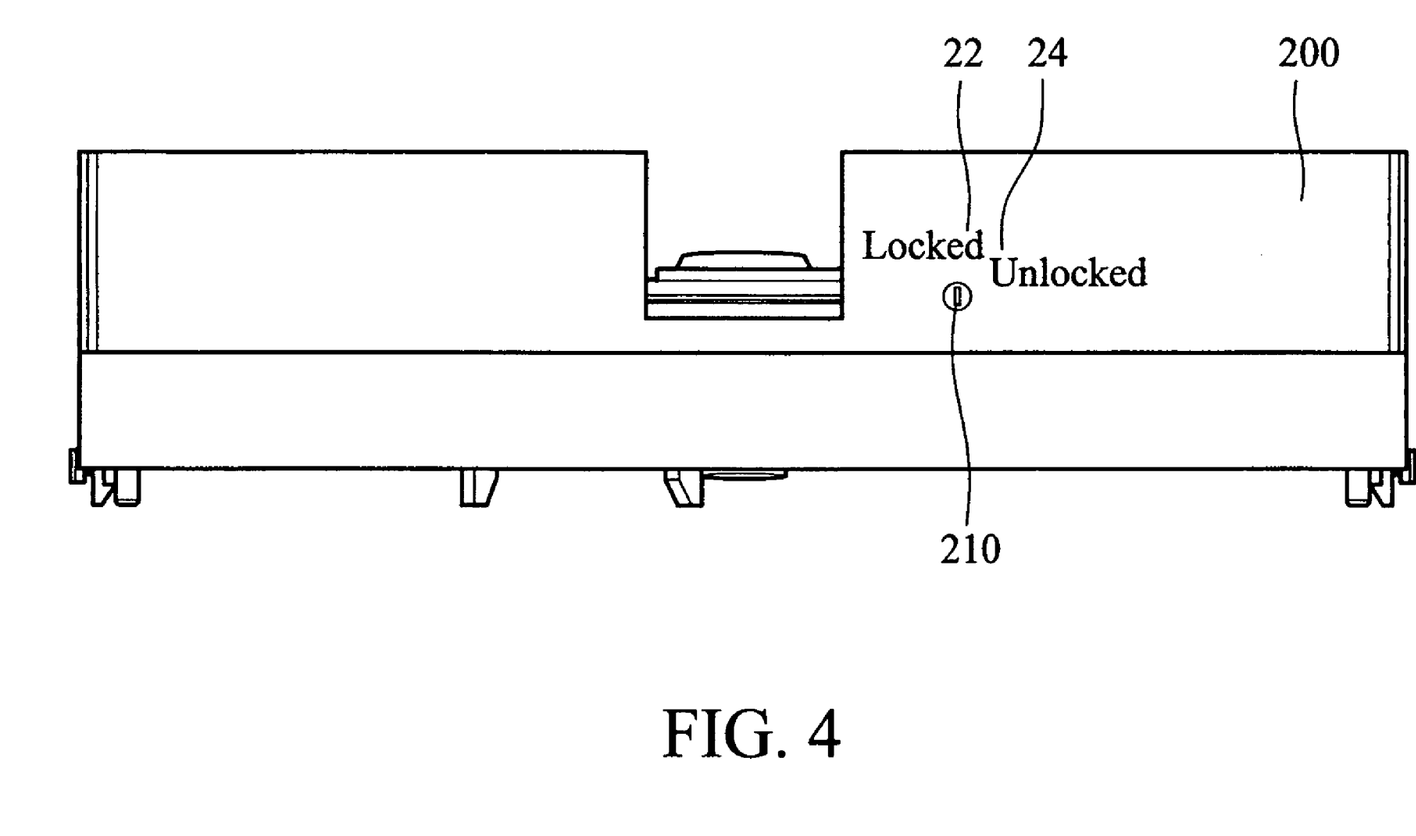
FIG. 4 is a schematic view showing the chassis of the invention.

Referring to FIG. 2, the sub guide rod has two ends. One end has a linear slot 210 thereon and protrudes from the chassis 200. The protrusion 208 on the sub guide rod 202 can be positioned at either a first position 22 or a second position 24 as turning the sub guide rod 202 by external means such as a screwdriver. As shown in FIG. 4, the labels on the chassis 200 are "locked" and "unlocked". Referring to FIG. 2, when the slot 210 points to "locked", the protrusion 208 of the sub guide rod 202 is positioned at the first position 22, and the movement of the pickup head is restricted by the protrusion 208 since the clamp 206 of the pickup head 204 is blocked by the protrusion 208. In addition, the slot 210 can be turned by a screwdriver or other similar tool to rotate the sub guide rod 202. Hence, prior to shipping, turning the slot 210 to the "locked" position so as to restrict the movement of the pickup head 204.

When the protrusion 208 of the sub guide rod 202 is turned to the second position 24, the slot 210 points to "unlocked", and the pickup head 204 is in a released status. Therefore, when a user wants to use the optical disk drive, he can turn the sub guide rod 202 to the "unlocked" status, unlocking the protrusion 208 and the clamp 206, and the pickup head 204 is released.

Figure 5:
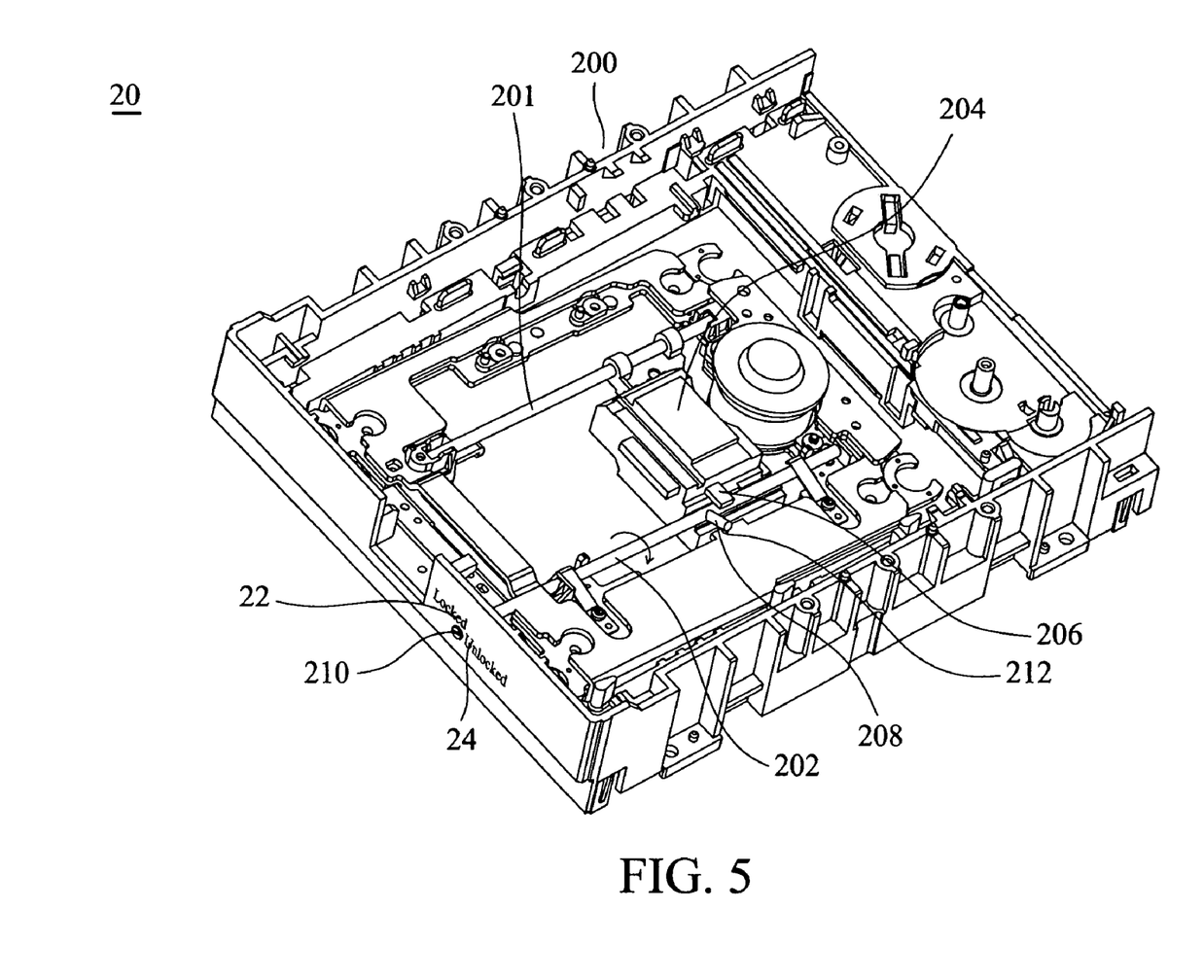
FIG. 5 is a schematic view showing a released status of the pickup head of the optical disk drive in the first embodiment of the invention.

FIG. 5 is a schematic view showing the optical disk drive in a released status according to the first embodiment of the invention. As shown in FIG. 5, the optical disk drive has a sensor 212, and the sub guide rod 202 is disposed between the clamp 206 and the sensor 212. When the protrusion 208 is in the second position 24, the protrusion 208 contacts the sensor 212, and the sensor 212 detects the separation of the protrusion 208 from the clamp 206. The sensor 212 can then send out a signal to notify a computer system that the pickup head 204 is movable.

Figure 6:
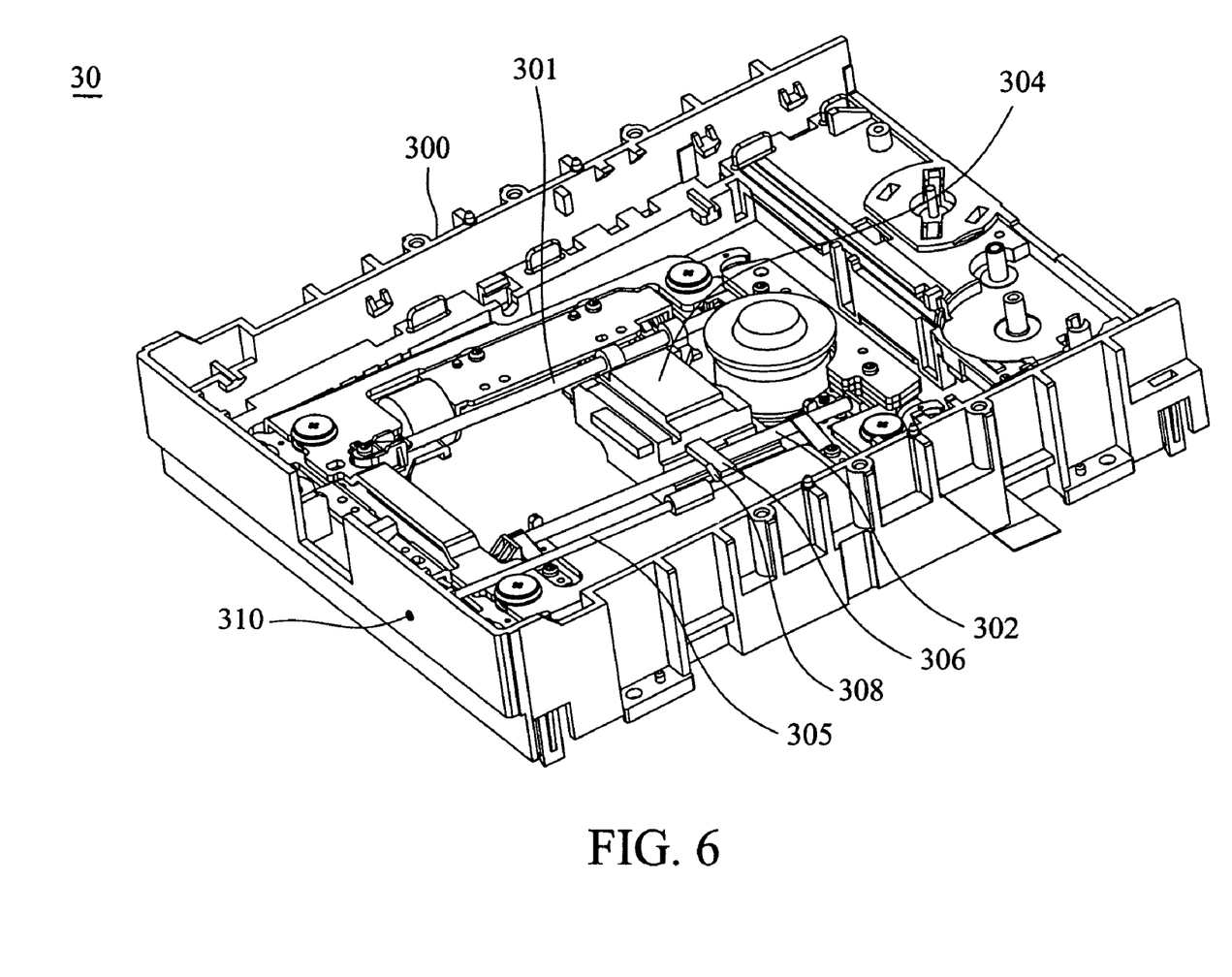
FIG. 6 is a schematic view showing a second embodiment of the invention.
Figure 7:
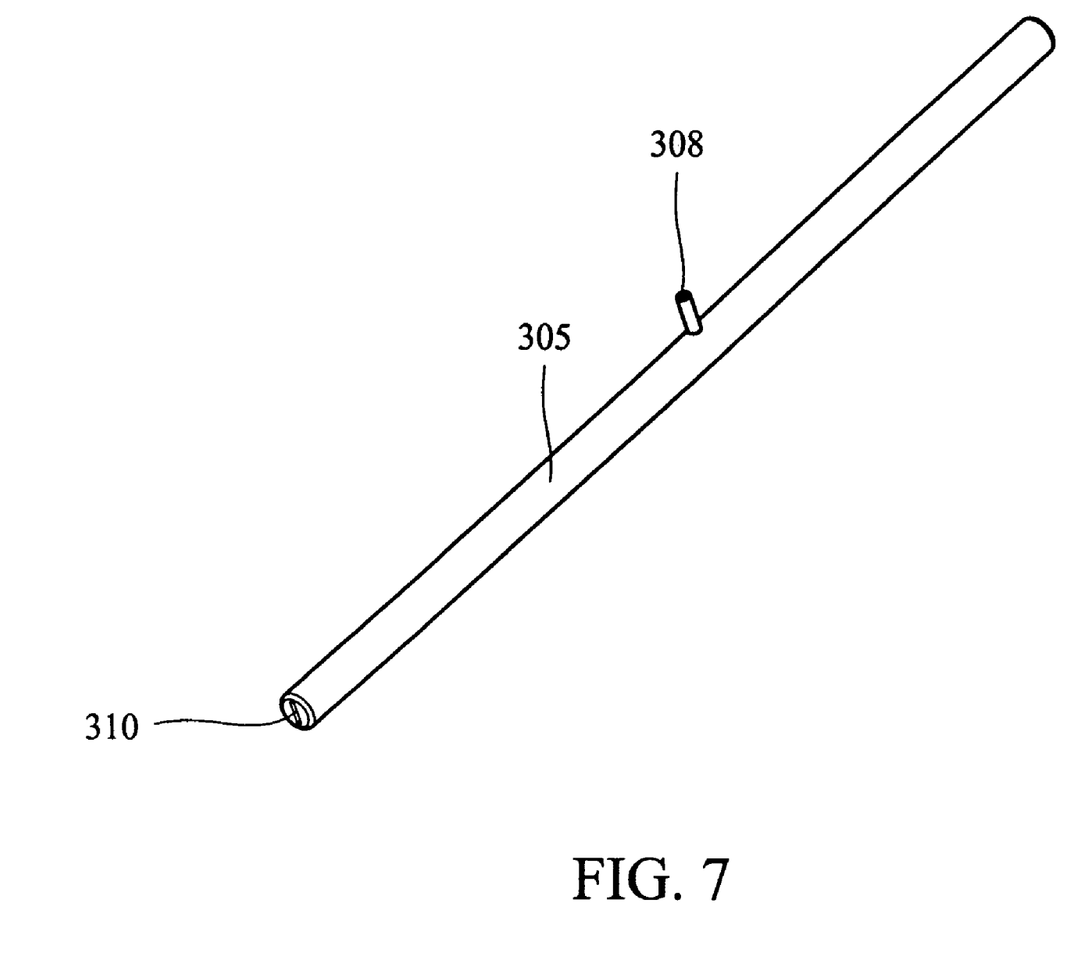
FIG. 7 is an enlarged view showing the shaft according to the second embodiment of the invention.
Figure 8:
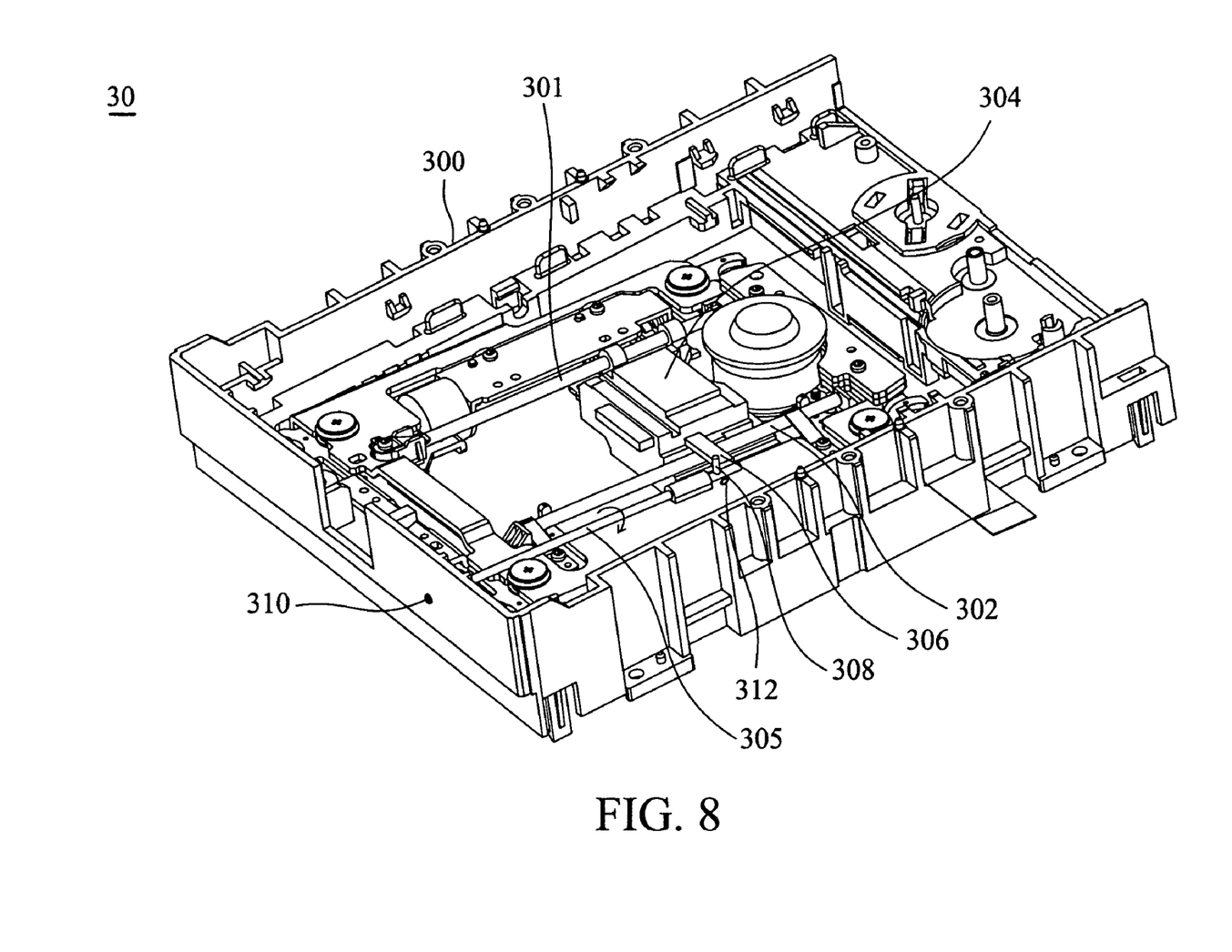
FIG. 8 is a schematic view showing a released status of the pickup head of the optical disk drive in the second embodiment of the invention.

FIG. 6 is a schematic view showing the optical disk drive according to a second embodiment of the invention. The optical disk drive 30 has a chassis 300, a main guide rod 301, a sub guide rod 302, a pickup head 304, a clamp 306, and a protrusion 308, and a shaft 305. In this embodiment, the sub guide rod 302 is the same as the sub guide rod 102 of the prior art. The protrusion 308 is positioned on the shaft 305. The shaft 305 is disposed beside and substantially parallel to the sub guide bar 302, as shown in FIG. 6. FIG. 7 shows the shaft 305. The shaft 305 has two ends, one of which has a slot 310 thereon. In addition, one of these two ends is extended out of the chassis 300. The working principle of the second embodiment is the same as that of the first embodiment. The optical disk drive is in a locked status as shown in FIG. 6 when the protrusion 308 on the shaft 305 blocks the clamp 306, and the optical disk drive is in a released status when the protrusion 308 is separated from the clamp 306, as shown in FIG. 8.

The optical disk of the second embodiment also has a sensor 312. The shaft 305 is disposed between the clamp 306 and the sensor 312. The sensor 312 detects the separation of the protrusion 308 and the clamp 306, so as to detect the pickup head 304 is moveable.

The protecting or fixing mechanism as shown in the present invention can be applied to any electronic device with movable elements on the guide rods, such as scanners or inkjet printers. By implementing the locking mechanism of the present invention, the pickup head is locked before shipping.

In conclusion, the present invention provides protection of an optical disk drive during shipping. The present invention is easily applied, no other change of the internal element of the optical disk drive is required.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An optical disk drive, comprising:
   a main guide rod;
   a sub guide rod disposed substantially parallel to the main guide rod;
   a pickup head, movably disposed on the main guide rod and the sub guide rod, having a clamp to grasp the sub guide rod;
   a protrusion disposed on the sub guide rod, being movable between a first and a second position;
   wherein the protrusion blocks the clamp and restricts a movement of the pickup head when the protrusion is in the first position; and
   the clamp is released when the protrusion is in the second position.

2. The optical disk drive as claimed in claim 1, wherein the sub guide rod has two ends, and a slot is formed on one of the ends.

3. The optical disk drive as claimed in claim 2, further comprising a chassis, and one of the ends of the sub guide rod being extended out of the chassis.

4. The optical disk drive as claimed in claim 1, wherein the optical disk drive further comprises a sensor, the sub guide rod is disposed between the clamp and the sensor, and the protrusion contacts the sensor, which detects a separation between the protrusion and the clamp, so as to detect a movable status of the pickup head movable when the protrusion is in the second position.

5. An optical disk drive, comprising:
   a main guide rod;
   a sub guide rod disposed substantially parallel to the main guide rod;
   a pickup head, movably disposed on the main guide rod and the sub guide rod, having a clamp to grasp the sub guide rod;
   a sensor;
   a shaft disposed substantially parallel to the sub guide rod and between the clamp and the sensor;
   a protrusion disposed on the shaft and contacting the sensor, being movable between a first and a second position;
   wherein the protrusion blocks the clamp and restricts a movement of the pickup head when the protrusion is in the first position; and
   wherein the sensor detects a separation between the protrusion and the clamp, so as to detect a movable status of the pickup head when the protrusion is in the second position, and the clamp is released when the protrusion is in the second position.

6. The optical disk drive as claimed in claim 5, wherein the shaft has two ends, and a slot is formed on one of the ends.

7. The optical disk drive as claimed in claim 6, further comprising a chassis, and one of the ends of the sub guide rod being extended out of the chassis.

* * * * *